J. J. RALYA.
Wheels for Vehicles.

No. 136,761.

Patented March 11, 1873.

Witnesses.
Edmund Masson.
John R. Young

Inventor:
Jno. J. Ralya, by
Prindle & Co. his Attys

UNITED STATES PATENT OFFICE.

JOHN J. RALYA, OF CLEVELAND, OHIO.

IMPROVEMENT IN WHEELS FOR VEHICLES.

Specification forming part of Letters Patent No. 136,761, dated March 11, 1873.

*To all whom it may concern:*

Be it known that I, JOHN J. RALYA, of Cleveland, in the county of Cuyahoga and in the State of Ohio, have invented certain new and useful Improvements in Carriage-Wheels; and do hereby declare that the following is a full, clear, and exact description thereof, reference being had to the accompanying drawing making a part of this specification, in which—

Figure 1:
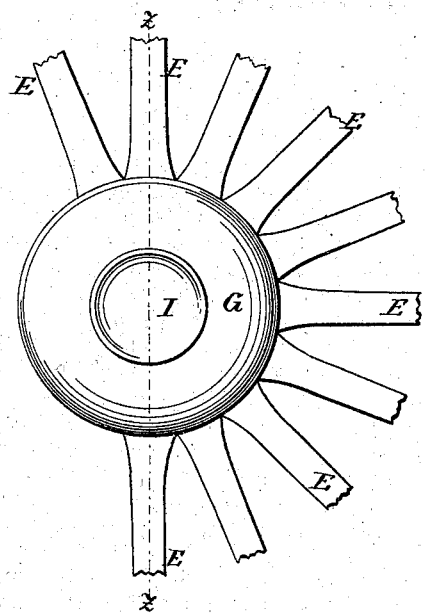
Figure 2:
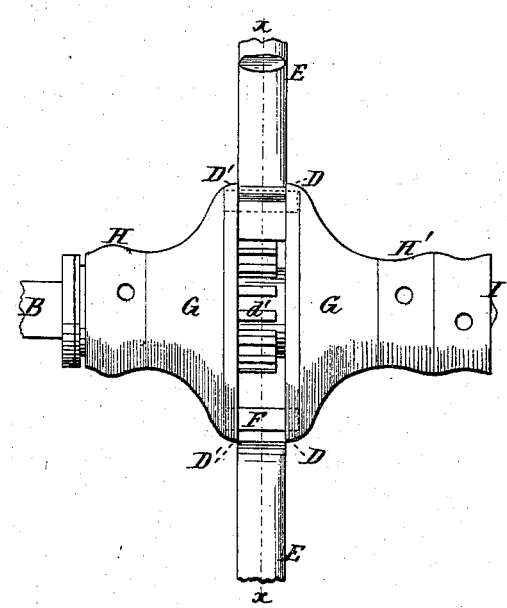
Figure 3:
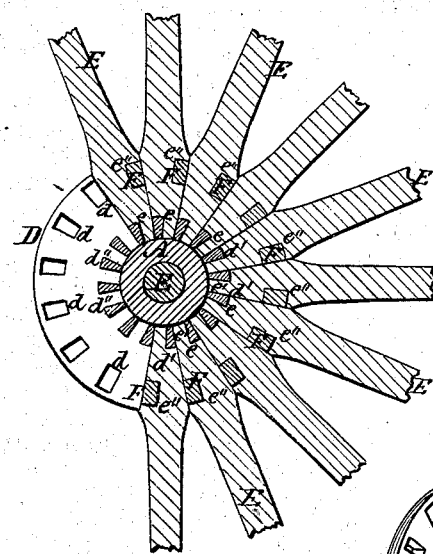
Figure 4:
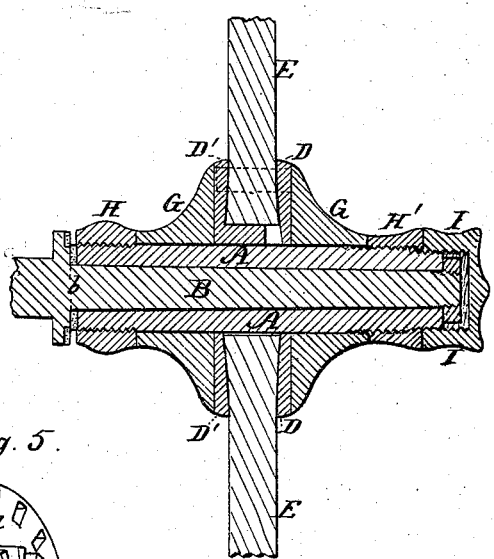
Figure 5:
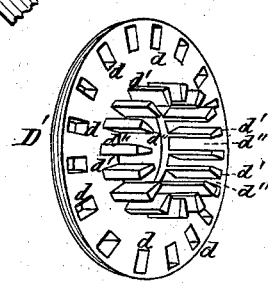

Figure 1 is an end elevation of my improved hub. Fig. 2 is a side elevation of the same. Fig. 3 is a cross-section upon line $x\ x$ of Fig. 2. Fig. 4 is a longitudinal section upon the line $z\ z$ of Fig. 1, and Fig. 5 is a perspective view of one of the slotted bearing-collars having attached to its inner side and edge a series of lugs which form mortises for the reception of the inner ends of the spokes.

Letters of like name and kind refer to like parts in each of the figures.

The design of my invention is to render more easy the insertion of spokes within or removal from a hub, and to increase the strength and durability of said parts; to which end it consists, principally, in the combination of the slotted converging bearing-collars, grooved spokes with flaring ends and interlocking keys, substantially as and for the purpose hereinafter specified. It consists, further, in combining with the bearing-collars and the tenoned ends of the spokes suitable mortise-lugs, substantially as and for the purpose hereinafter shown. It consists, further, in combining with the bearing-collars and thimbles two supporting-collars and binding-nuts, which have screw-threads that turn in opposite directions, substantially as and for the purpose hereinafter set forth. It consists, finally, in the device as a whole, when its several parts are constructed and combined substantially as and for the purpose hereinafter shown and described.

In the annexed drawing, A represents the thimble, constructed preferably of iron in the form of a hollow cylinder, which corresponds in interior dimensions to the arm or bearing B of the axle and in length to the distance between the shoulder $b$ and nut C, which form, respectively, the inner and the outer ends of said bearing. The periphery of the thimble has a uniform size along its entire length, and upon it are loosely fitted two collars, D and D', the outer faces of which are parallel, and have a right angle to the line of said thimble, while their contiguous faces converge slightly from their inner edges outward so as to form an annular space having, in section, a dovetail shape. Passing through each collar D at equidistant points around its outer portion are a series of rectangular openings, $d$, which are arranged with their longest axis upon radial lines. From the inner edge of the inner side of the collar D' a series of lugs, $d'$, corresponding in number to the openings $d$, extend horizontally outward to or near the opposite collar D, and are arranged with relation to said openings so as to occupy positions radially between the same. One face of each lug is constructed upon a line, radially, with the contiguous side of the corresponding opening, while the opposite face of said lug is formed upon a line parallel with the face of the adjacent lug, by means of which construction a mortise, $d''$, is formed between each pair of lugs that has a general direction slightly oblique to a radial line. Between the collars D are fitted a series of spokes, E, which correspond in number to the openings $d$ and mortises $d''$, and have their edges conformed in shape to the converging faces of said collars. The contiguous sides of the spokes are constructed upon radial lines, and impinge upon each other, so that when in place said spokes form a continuous arch of wood. A rabbet, $e$, corresponding in size and shape to the like features of the lugs $d'$, is cut in the lower end at one side of each spoke, and between said rabbet and the opposite side is left a tenon, $e'$, which fits into and fills one of the adjacent mortises. Within the same side of the spoke as the tenon is provided a groove, $e''$, which corresponds in size and position to the like features of the abutting openings $d$, and permits of the insertion through the same of a key, F, constructed preferably of wood, said key being closely fitted and driven to place. Upon the outer side of each collar D is placed a second collar, G, which has the ornamental form shown in Figs. 2 and 4, and is fitted loosely over the thimble A. A nut, H, is fitted upon each end of the thimble (which is suitably threaded for the purpose) and being screwed inward forces the collars D toward each other, so as to compress between the same the spokes, and firmly hold them in place. In order to give additional s.- curity to the positions of the parts composing the hub, the nut H' upon the outer end of the same and the corresponding end of the thimble A are provided with a screw-thread having a left-hand or opposite direction from that given to the inner nut. The outer end of the hub and of the axle-arm B are inclosed by means of a cap, I, which screws upon the thimble A outside of the nut H', and not only serves the purpose named, but also acts as a jam nut or lock for the latter, the threads for said nuts having opposite directions.

The device is now complete and possesses the following-named advantages: First, the spokes are firmly held in place and supported laterally and endwise, and in addition thereto are pressed inward by the action of the inclined faces of the bearing-collars operating upon the flaring edges of said spokes. The spokes may be pressed inward still more firmly by making the keys slightly wedge-shaped, radially, so that when driven to place said keys shall exert a downward pressure upon the lower sides of their grooves. Second, the hub is easily and quickly taken apart whenever it becomes necessary to repair or replace any part. Third, from its peculiar construction, any desired ornamentation or apparent degree of lightness can be had without lessening its efficiency, while, as the entire bearing is inclosed from its inner end outward, no oil can escape to soil the wheel, nor can dust or dirt get upon or between the bearing-surfaces.

Having thus fully set forth the nature and merits of my invention, what I claim as new is—

1. The bearing-collars D, provided with the openings $d$ and having their contiguous faces made concave, the spokes E provided with the grooves $e''$ and made flaring at their edges and inner ends, and the keys F fitted into said openings $d$ and grooves $e''$, when said parts are combined with each other, the thimble A, and suitable compressing devices, substantially as and for the purpose specified.

2. In combination with the bearing-collars D and spokes F provided with tenons $e'$, the lugs $d'$ secured to or upon the inner portion and inner face of one of said collars and forming the mortises $d''$, substantially as and for the purpose shown.

3. In combination with the bearing-collars D and thimble A, the supporting-collars G fitted over said thimble, and the binding-nuts H fitted upon the same and having relatively right and left hand screw-threads, substantially as and for the purpose set forth.

4. The hereinbefore-described device as a whole, when constructed as shown and combined with the axle-arm in the manner and for the purpose substantially as described.

In testimony that I claim the foregoing I have hereunto set my hand and seal this 14th day of February, 1873.

JOHN J. RALYA. [L. S.]

Witnesses:
THOMAS J. CANAN,
THOS. COFFEE.